(12) United States Patent
Ragan

(10) Patent No.: US 10,773,892 B2
(45) Date of Patent: Sep. 15, 2020

(54) AIR BEARING CONVEYOR

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 73 days.

(21) Appl. No.: 16/090,836

(22) PCT Filed: Apr. 6, 2017

(86) PCT No.: PCT/US2017/026413
§ 371 (c)(1),
(2) Date: Oct. 3, 2018

(87) PCT Pub. No.: WO2017/184351
PCT Pub. Date: Oct. 26, 2017

(65) Prior Publication Data
US 2020/0115163 A1 Apr. 16, 2020

Related U.S. Application Data

(60) Provisional application No. 62/324,736, filed on Apr. 19, 2016.

(51) Int. Cl.
*B65G 13/04* (2006.01)
*B65G 13/06* (2006.01)
*B65G 13/11* (2006.01)
*B65G 54/02* (2006.01)

(52) U.S. Cl.
CPC ............ *B65G 13/04* (2013.01); *B65G 13/06* (2013.01); *B65G 13/11* (2013.01); *B65G 54/02* (2013.01); *B65G 2207/06* (2013.01); *B65G 2207/26* (2013.01); *B65G 2811/092* (2013.01); *B65G 2812/16* (2013.01)

(58) Field of Classification Search
CPC ......... B65G 13/04; B65G 13/06; B65G 13/11
USPC ......................................................... 198/493
See application file for complete search history.

(56) References Cited

U.S. PATENT DOCUMENTS

| 4,603,458 | A | 8/1986 | Hirohata |
| 6,208,045 | B1 | 3/2001 | Hazelton et al. |
| 6,607,157 | B1* | 8/2003 | Duescher ............... B65H 20/34 |
| | | | 242/417.3 |
| 8,146,388 | B2 | 4/2012 | Anderson et al. |
| 2004/0118661 | A1 | 6/2004 | Swinderman et al. |
| 2005/0040016 | A1 | 2/2005 | Tasma et al. |
| 2015/0034455 | A1 | 2/2015 | Ragan |
| 2015/0224718 | A1 | 8/2015 | Ederer et al. |
| 2017/0264182 | A1* | 9/2017 | Ragan ..................... H02K 41/02 |

FOREIGN PATENT DOCUMENTS

DE 3344267 A1 6/1984
JP 54-49786 A 4/1979

* cited by examiner

*Primary Examiner* — Gene O Crawford
*Assistant Examiner* — Lester Ill Rushin
(74) *Attorney, Agent, or Firm* — James T. Cronvich

(57) ABSTRACT

A roller conveyor having a bed of rollers supported by air bearings and driven by a linear-motor stator. The rollers are made of electrically conductive or magnetic material to operate as rotors forming linear motors with the linear stator. Air bearings support the ends of the rollers. Intermediate air bearings support the middle of long rollers in wide conveyors.

20 Claims, 4 Drawing Sheets

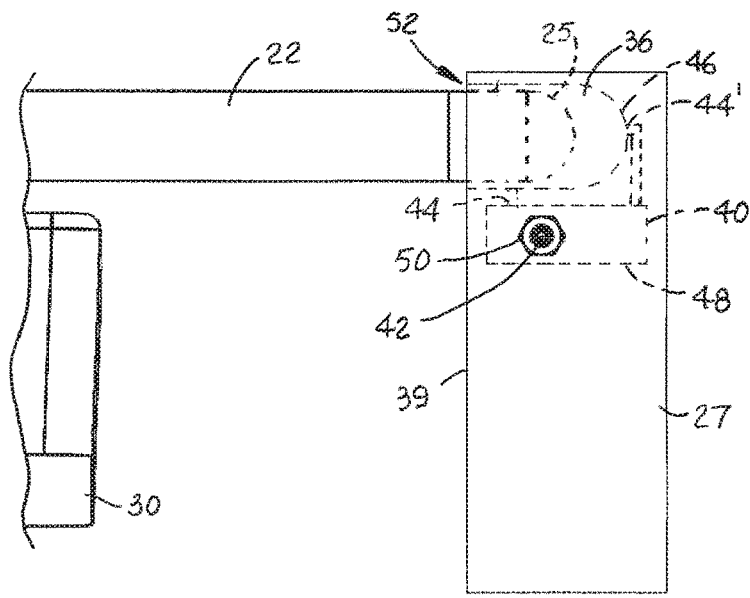
FIG. 3
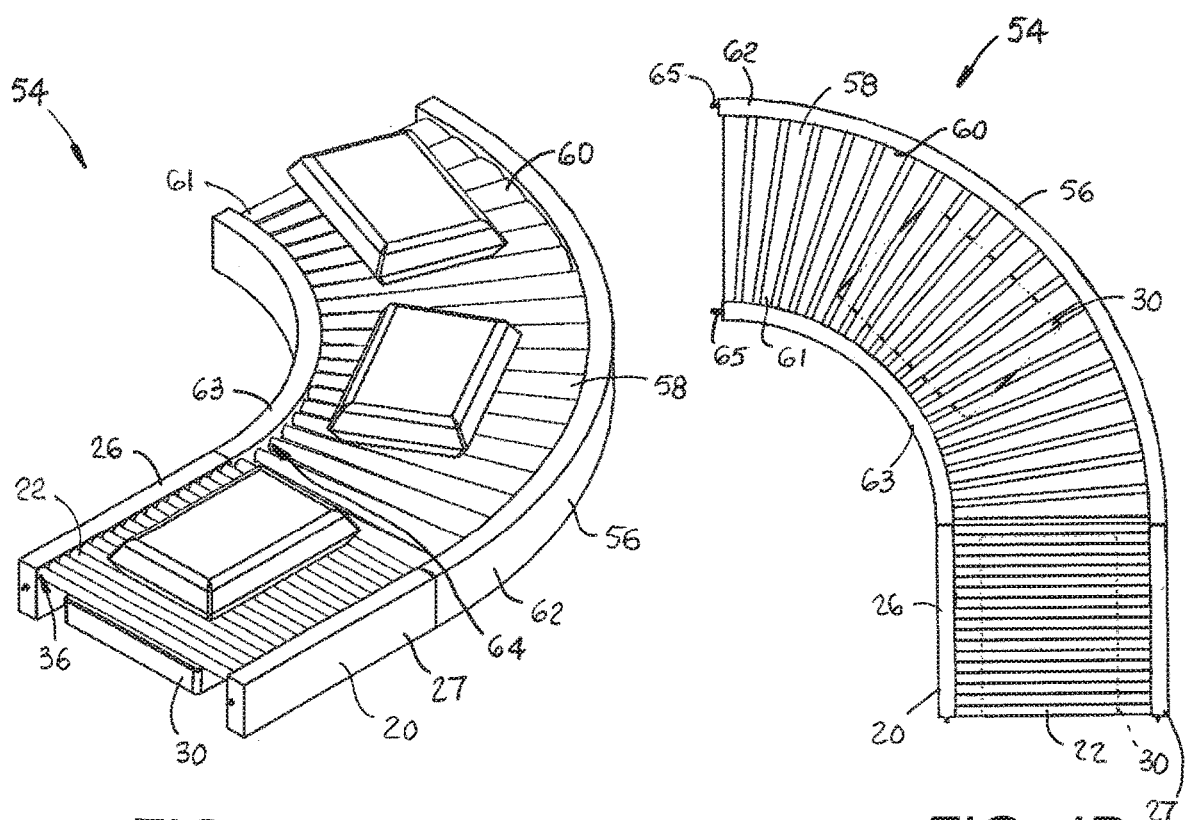
FIG. 4A
FIG. 4B

AIR BEARING CONVEYOR

BACKGROUND

The invention relates generally to power-driven conveyors and more particularly to roller conveyors supported on air bearings.

Conventional conveying systems, such as flat-belt conveyors, modular-plastic-belt conveyors, and free- and powered-roller conveyors have many components. Conveyors with many parts cause problems in food applications because they provide harbors for dirt, grime, and other undesirable materials. Motors, gearboxes, roller bearings, shafts, pulleys, and sprockets can all collect food particles and require regular cleaning. And because the components must meet rigorous food-use standards, the cost of conveyors in food applications is high. Conventional free- and powered-roller conveyors are normally avoided in food-contact applications because their axles and bearings are subject to contamination.

SUMMARY

One version of a conveyor embodying features of the invention comprises a plurality of rollers arranged to form a conveying surface for conveying articles atop the rollers along the length of the conveyor in a conveying direction from an entrance to an exit. Each of the rollers has a first end and an opposite second end across the width of the conveyor and an article-transport portion between the first and second ends. A set of first air bearings supports the first ends of the rollers, and a set of intermediate air bearings supports the rollers at intermediate positions between the first ends and the second ends of the rollers. A driver rotates the rollers, which are supported on a cushion of air by the first and intermediate air bearings.

Another version of a conveyor embodying features of the invention comprises a plurality of rollers arranged to form a conveying surface for conveying articles on the rollers along the length of the conveyor in a conveying direction from an entrance to an exit. Each of the rollers has a first end and an opposite second end across the width of the conveyor and an article-transport portion between the first and second ends. A set of first air bearings supports each of the rollers at the first ends. A set of second air bearings supports the rollers at the second ends. The rollers include electrically conductive or magnetic material to act as rotors forming linear motors with a linear stator. The first and second ends of the rollers are supported on a cushion of air as they rotate in the first and second air bearings.

BRIEF DESCRIPTION OF THE DRAWINGS

FIG. 3 is an enlarged front elevation view of one side end of the roller conveyor of FIG. 1;

FIGS. 4A and 4B are isometric and top plan views of a linear-motor-driven roller conveyor as in FIG. 1 joined with a LIM-driven, air-bearing-supported roller-conveyor turn section;

DETAILED DESCRIPTION

Figure 1:
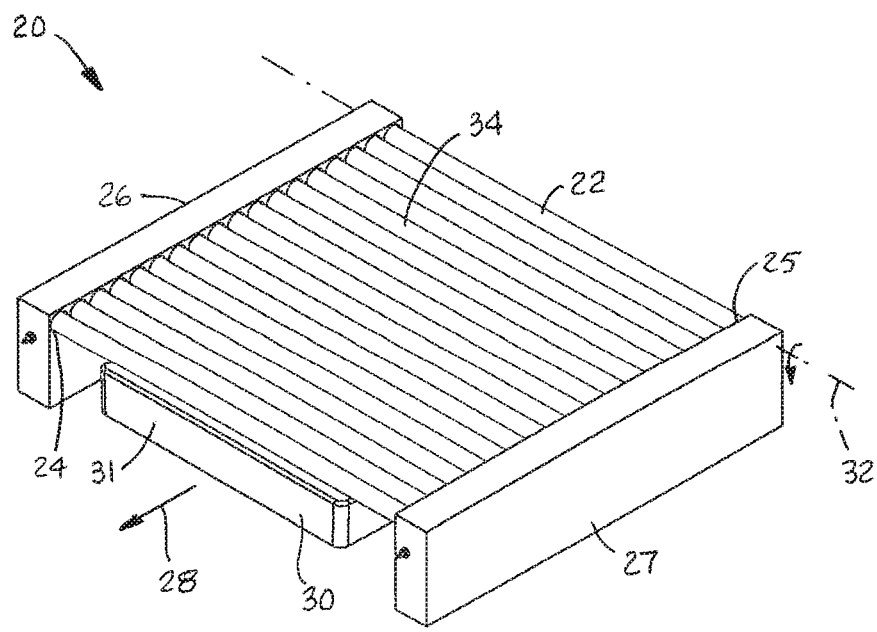
FIG. 1 is an isometric view of a linear-motor-driven roller conveyor embodying features of the invention including air bearings.

FIG. 1 shows one version of a roller conveyor embodying features of the invention. A roller conveyor assembly 20 includes a plurality of rollers 22 having first and second ends 24, 25 supported in first and second bearing housings 26, 27. The rollers 22 extend axially across the width of the conveyor perpendicular to the conveying direction 28. The rollers 22 include electrically conductive or magnetic material and are driven in rotation by a linear stator 30 in a cleanable housing 31 under the rollers. If the rollers 22 have electrically conductive material, they act as rotors to form a linear-induction motor (LIM) with the linear stator 30. If the rollers have permanent magnetic material arranged as poles, they act as rotors to form a linear-synchronous motor with the stator 30. In either case the stator 30, operating as the roller drive, causes the rollers 22 to rotate on their axes 32. The side-by-side rollers 22 form an upper conveying surface 34 atop which articles are propelled along the length of the roller conveyor 20 in the conveying direction 28. The axial lengths of the rollers 22 between the supported ends 24, 25 form article-transport portions of the rollers.

Figure 2:
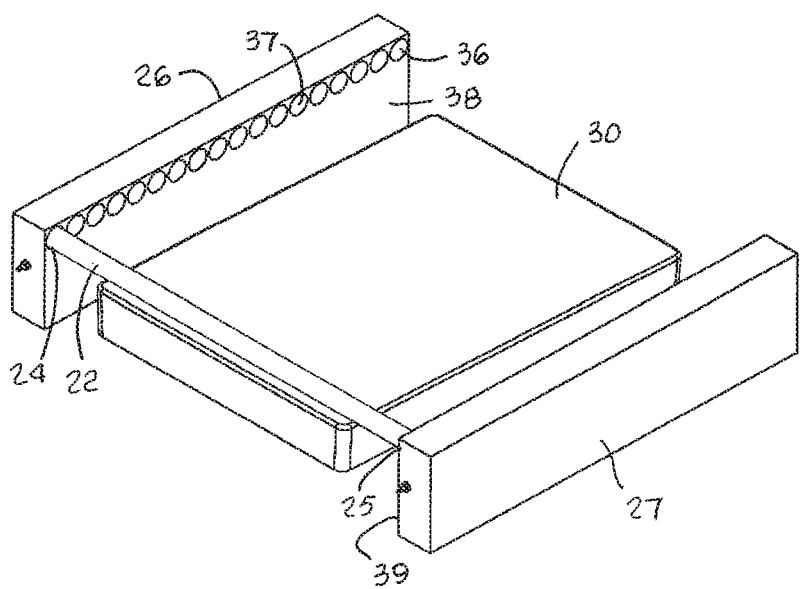
FIG. 2 is an isometric view of the roller conveyor of FIG. 1 with some of the rollers removed to show the linear-motor stator.

As shown in FIGS. 2 and 3, the bearing housings 26, 27 each have a row of cavities 36 opening through open ends 37 onto facing inner sides 38, 39 of the housings. The ends 24, 25 of the rollers 22 are received in the cavities 36 and support the rollers. The bearing housings 26, 27 each have an air channel 40 that extends from an air inlet 42 to air outlets 44 that open into each of the cavities 36. The air outlets 44 may open into the bottoms or radial sides of the cavities, or the outlets 44' may additionally or alternatively open into the cavities through the cavities' blind ends 46 to provide a thrust bearing as well. The air channel 40 may include a plenum 48 for uniform air flow exiting the outlets 44. An air fitting 50 provides a connection for an air hose from a source of compressed air (not shown). The air source injects air through the air inlet 42 and out the outlets 44, which are in fluid communication with the inlet through the air channel 40. The pressurized air exiting the outlets 44 into the cavities 36 provides a cushion of air for almost frictionless support of the ends 25 of the rollers 22. Thus, the pressurized cavities 36 form low-friction rotary and thrust air bearings 52 for the rollers 22. The low-friction air bearings 52 reduce the roller drive's power requirements and enable high conveying speeds. And the positive air pressure in the cavities 36 resists the entry of contaminants. The air channel 40 lends itself to periodic flushing with disinfectants. The minimal-part configuration made possible by the air bearings makes the conveyor easy to clean.

As shown in FIG. 3, the ends 25 of the rollers are convexly rounded or domed in a hemispherical shape, and the blind ends 46 of the cavities 36 are hemispherically concave in a mating shape to provide relatively low-friction contact in case air pressure drops or is lost. Additionally, the ends of the rollers 22 or the walls of the cavities 36 can be coated with a low-friction material, such as PTFE or UHMW, to further reduce contact friction between the rollers and the cavity walls.

A roller conveyor with a turn section is shown in FIGS. 4A and 4B. The roller conveyor 54 includes a straight roller conveyor segment and a turn segment 56. The straight segment uses the linear-motor-driven roller conveyor 20 of FIG. 1. Rollers 58 in the turn segment 56 are frustoconical in shape with a large diameter at an end 60 at the outside of the turn and a small diameter at an end 61 at the inside of the turn. Like the cylindrical rollers 22 in the straight segment 20, the frustoconical rollers 58 in the turn segment include electrically conductive or magnetic material so that they can be rotated by a linear-motor stator 30. In this example the linear stator 30 drives only those rollers situated directly above it. The other rollers can be connected to the driven rollers by belts or can be passive and rotate freely. And like the straight roller conveyor 20, the turn conveyor 56 has bearing assemblies 62, 63 at the outside and inside of the turn. The turn-conveyor bearing assemblies 62, 63 have rows of cavities 64 and air channels like the cavities 36 in the straight-conveyor bearing assemblies 26, 27. The turn-conveyor bearing assemblies 62, 63 are shown with an air inlet 65 at an end opposite to the straight segment 20. But each could have an air fixture at the opposite end to mate with an air fixture on the abutting end of the straight conveyor 20. Because the air-bearing assemblies 26, 27, 62, 63 have air fixtures at both ends, conveyor segments can be connected in series with the air channels on each side in fluid communication and pressurized through an air hose connected to a source of pressurized air. In this way roller conveyors can be constructed of interconnected modular air-bearing assemblies to any length and with any number of turns.

Figure 5:
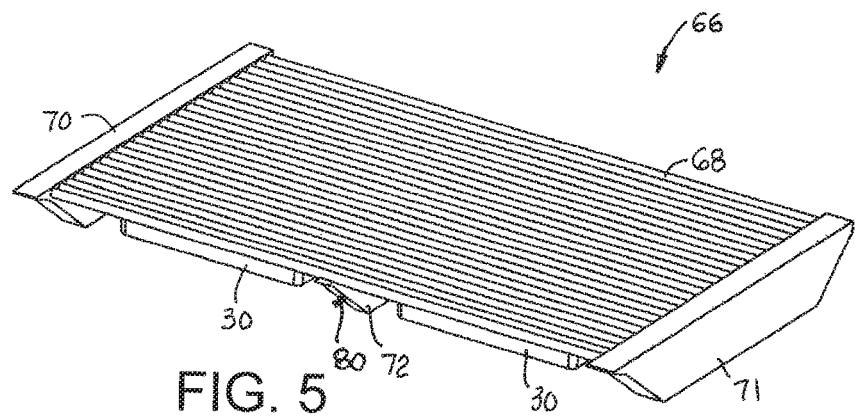
FIG. 5 is an isometric view of a wide version of a linear-motor-driven roller conveyor as in FIG. 1 with an intermediate air bearing supporting the middle of the rollers' span.
Figure 6:
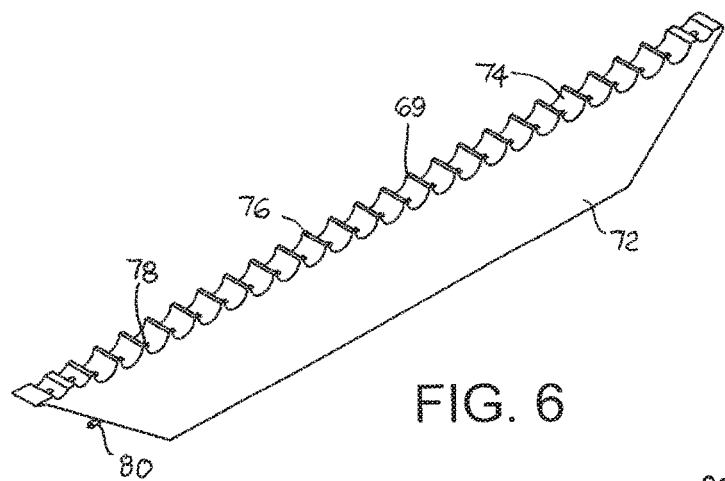
FIG. 6 is an enlarged isometric view of the intermediate air bearing of FIG. 5.

A wide roller conveyor 66 is shown in FIG. 5. The rollers 68 are axially longer than the rollers 22 in FIG. 1 and require support in the middle to prevent them from bowing. The rollers 68 are supported by air-bearing assemblies 70, 71 at each end. An intermediate air-bearing assembly 72 supports the rollers 68 at an intermediate position between the two ends. Linear stators 30 on each side of the intermediate air bearings 72 drive the overlying rollers 68. The top side 69 of the intermediate air-bearing assembly 72, as shown in FIG. 6, has a series of open-top troughs 74 separated by laterally extending ridges 76. An air outlet 78 opens into each trough 74 at the bottom in this version. The air outlets are in fluid communication with an air inlet 80 via an internal air channel (not shown, but similar to those described previously). The rollers 68 are received in the troughs 74 and supported on air cushions provided by the air outlets 78.

Figure 7:
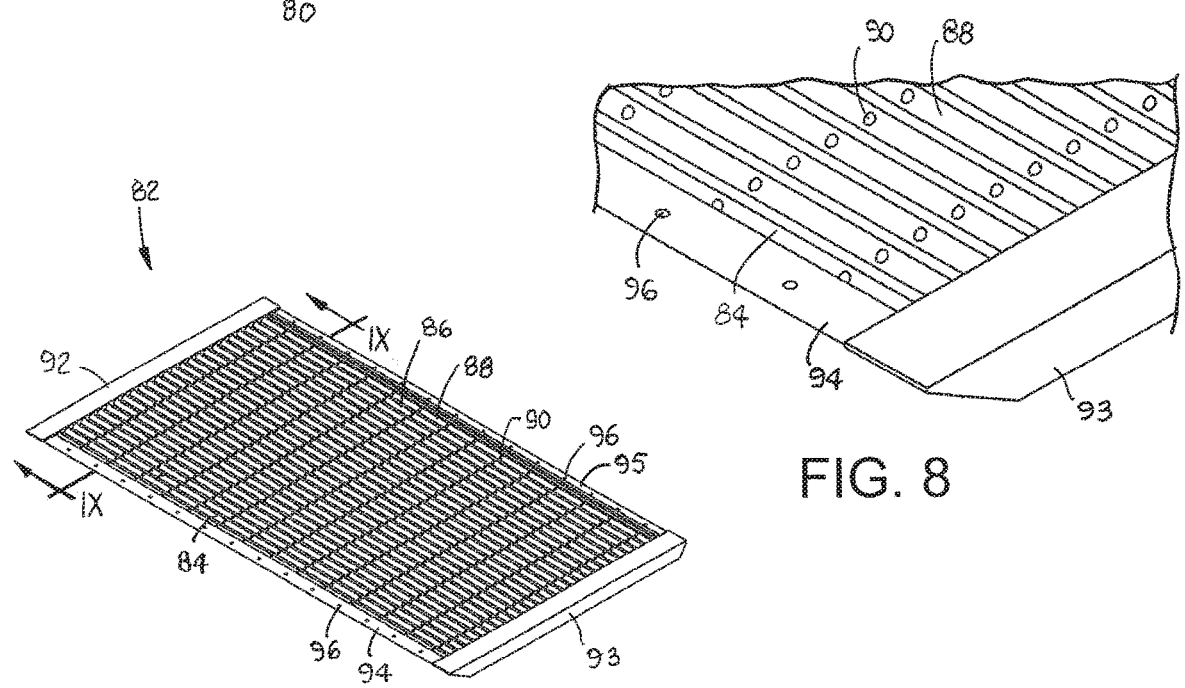
FIG. 7 is an isometric view of another version of a linear-motor-driven roller conveyor as in FIG. 5 with an intermediate air-bearing support bed for the rollers.
Figure 8:
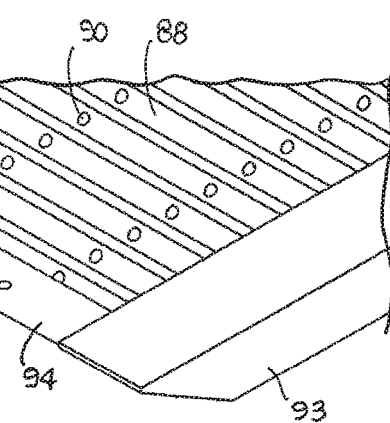
FIG. 8 is an enlarged isometric view of a side end of the roller conveyor of FIG. 7 with the rollers removed.

Another version of a roller conveyor is shown in FIGS. 7 and 8. In this version the rollers of the roller conveyor 82 are supported on air bearings provided by a bearing assembly 84 having a top side 86 with a series of elongated, open-top troughs 88 extending across the width of the conveyor. The troughs 88 support the rollers on air cushions provided by air outlets 90 spaced apart laterally across the lengths of the troughs. The ends of the rollers are supported in side bearing assemblies 92, 93 at each side of the conveyor 82. The side bearing assemblies 92, 93 can be air-bearing assemblies like those 70, 71 in FIG. 5.

Figure 9:
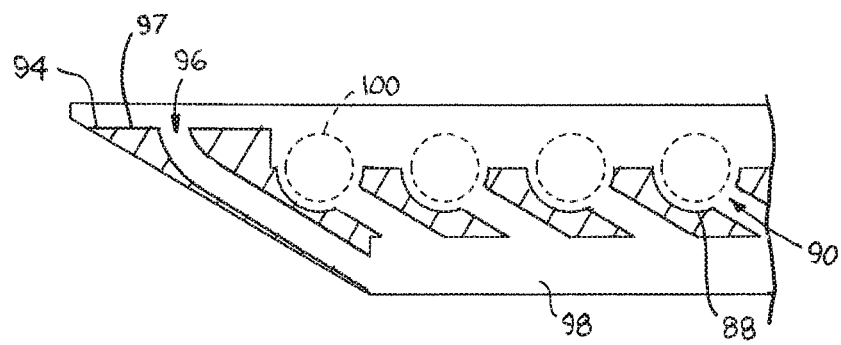
FIG. 9 is an enlarged cross section of the side end of the roller conveyor of FIG. 7 taken along line IX-IX.

Dead plates 94, 95 at downstream and upstream ends of the roller conveyor 82 of FIGS. 7 and 8 have air outlets 96 opening onto the top side. As shown in FIG. 9, the top faces 97 of the dead plates are at levels slightly above, slightly below, or at the level of a plane tangent to the conveying surface at the tops of the rollers 100. The air outlets 96 are in fluid communication with the air outlets 90 in the troughs 88 and an air inlet (not shown) via an air channel 98, as shown in FIG. 9. The air injected into the air channel 98 exits the outlets 90 in the troughs 88 to provide air bearings for the rollers 100. The air in the air channel 98 also exits the dead plate 94 through its air outlets 96 to provide a low-friction air cushion atop the dead plate for a smooth article transfer onto or off the roller conveyor. As in the other roller conveyors, the rollers 100 can be driven by a linear motor (not shown) under the conveyor bed.

Figure 10:
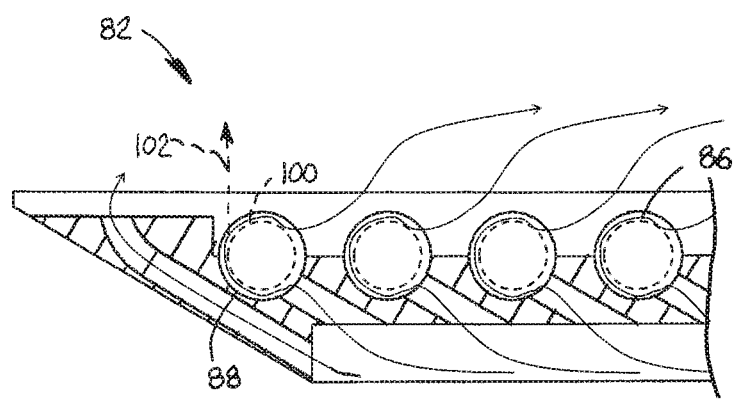
FIG. 10 is an enlarged cross section as in FIG. 9 showing the flow of air around the rollers and the Coanda effect.

FIG. 10 shows the airflow through the air-bearing assembly. As the air flows around the rollers 100, it tends to follow the peripheries of the rollers by the Coanda effect. Instead of exiting vertically (as indicated by dashed line 102) once past the troughs 88, the air continues to hug the rollers' peripheries. The result is airflow at the top side 86 directed along the length of the roller conveyor 82. The airflow can push conveyed articles along the conveyor as well as drive the rollers 100 and provide an air cushion to the rollers and to the conveyed articles.

Figure 11:
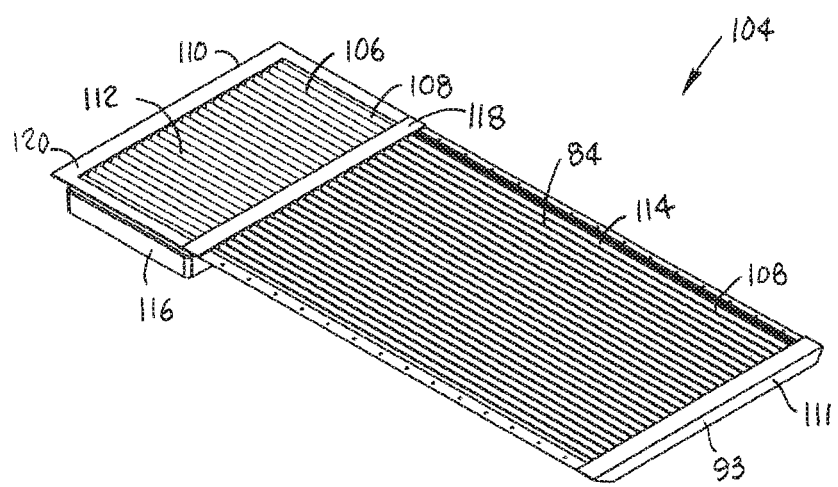
FIG. 11 is an isometric view of another version of a LIM-driven roller conveyor as in FIG. 7, in which the rollers are driven by a linear stator under an end region of the rollers.

Another version of a roller conveyor is shown in FIG. 11. The roller conveyor 104 has a side air-bearing assembly 93 and an intermediate air-bearing assembly 84 as in FIG. 7 side by side with a linear-motor bearing assembly 106. A composite roller 108 extends from the outer side 110 of the linear-motor assembly 106 to the outer side 111 of the air-bearing assembly 84. The composite roller 108 has a rotor portion 112 supported in the linear-motor assembly 106 and axially spaced from an article-transport portion 114 supported in the bearing assembly 84. At least the rotor portion 112 of the composite roller 108 contains electrically conductive or permanent-magnetic material to serve as a rotor forming a linear motor with a stator 116 below (as shown) or above the rotor portions. The driven rotor portions 112 and the offset article-transport portions 114 are supported at their junctions in an intervening bearing assembly 118 which may be an air bearing such as in FIG. 6. The outside end of the rotor portion 112 is supported by a bearing assembly 120, which may be an air-bearing assembly as in FIG. 1. The composite roller 108 can be made as a continuous roller or it can be made of segments coupled together, such as an electrically conductive rotor segment joined by a coupling, for example, end to end with an article-transport segment made of a different material selected to wear well and properly engage articles without requiring any electrically conductive material.

What is claimed is:
1. A conveyor comprising:
a plurality of rollers arranged to form a conveying surface for conveying articles atop the rollers along the length of the conveyor in a conveying direction from an entrance to an exit, wherein each of the rollers has a first end and an opposite second end across the width of the conveyor and an article-transport portion between the first and second ends;
a set of first air bearings supporting the first ends of the rollers and a set of intermediate air bearings supporting the rollers at intermediate positions between the first ends and the second ends of the rollers;
a driver rotating the rollers;
wherein the rollers are supported on a cushion of air by the first and intermediate air bearings;
wherein the set of intermediate air bearings includes a bearing assembly having an open top side.

2. A conveyor as in claim 1 wherein the driver is a linear stator and the rollers include electrically conductive or magnetic material to act as rotors forming linear motors with the linear stator.

3. A conveyor as in claim 2 wherein each of the rollers has a rotor portion axially spaced from the article-transport portion and disposed between the intermediate position and the second end, wherein the electrically conductive or magnetic material resides in the rotor portion.

4. A conveyor as in claim 1 further comprising a set of second air bearings supporting the second ends of the rollers.

5. A conveyor as in claim 1 wherein the top side of the bearing assembly of the set of intermediate air bearings is formed by one or more open-top troughs and wherein the bearing assembly includes an air channel having an air inlet and one or more air outlets in fluid communication with the air inlet and opening into the troughs at the top side to provide one or more air cushions supporting the rollers received in the troughs.

6. A conveyor comprising:
a plurality of rollers arranged to form a conveying surface for conveying articles atop the rollers along the length of the conveyor in a conveying direction from an entrance to an exit, wherein each of the rollers has a first end and an opposite second end across the width of the conveyor and an article-transport portion between the first and second ends;
a set of first air bearings supporting the first ends of the rollers and a set of intermediate air bearings supporting the rollers at intermediate positions between the first ends and the second ends of the rollers;
a driver rotating the rollers;
wherein the rollers are supported on a cushion of air by the first and intermediate air bearings;
wherein the set of intermediate air bearings includes:
a bearing assembly having a top side with a plurality of open-top troughs elongated across the width of the conveyor at the top side; and
an air channel having an air inlet and a plurality of air outlets in fluid communication with the air inlet and opening into the troughs at multiple positions along each trough to provide air cushions supporting the rollers received in the troughs.

7. A conveyor as in claim 6 wherein the air outlets direct the air at the rollers at a velocity high enough to rotate the rollers and serve as the driver.

8. A conveyor as in claim 6 wherein the air directed into the troughs by the air outlets travels in a path around the rollers and along the tops of the rollers in the conveying direction by the Coanda effect to provide an air cushion supporting the conveyed articles above the rollers and urging the articles in the conveying direction.

9. A conveyor as in claim 6 further comprising a dead plate disposed across the width of the conveyor at the entrance or the exit or both, wherein the dead plate has a top surface and air outlets opening onto the top surface and in fluid communication with the air channel.

10. A conveyor as in claim 1 wherein the first air bearings have bearing cavities receiving the first ends of the rollers and wherein either the first ends of the rollers or the bearing cavities or both are coated with a low-friction material.

11. A conveyor comprising:
a plurality of rollers arranged to form a conveying surface for conveying articles on the rollers along the length of the conveyor in a conveying direction from an entrance to an exit, wherein each of the rollers has a first end and an opposite second end across the width of the conveyor and an article-transport portion between the first and second ends,
a set of first air bearings supporting each of the rollers at the first ends and a set of second air bearings supporting the rollers at the second ends;
a linear stator;
wherein the rollers include electrically conductive or magnetic material to act as rotors forming linear motors with the linear stator;
wherein the first and second ends of the rollers are supported on a cushion of air as they rotate in the first and second air bearings;
a first air bearing assembly forming the set of first air bearings supporting the first ends of the rollers and a second air bearing assembly forming the set of second air bearings supporting the second ends of the rollers, wherein the first air bearing assembly and the second air bearing assembly each have an air inlet, a plurality of bearing cavities, and a plurality of air outlets in fluid communication with the air inlet to direct air from the air inlet into the bearing cavities to support the first and second ends of the rollers on air cushions.

12. A conveyor as in claim 11 further comprising a set of intermediate air bearings between the set of first air bearings and the set of second air bearings to support the rollers between the first and second ends.

13. A conveyor as in claim 12 further comprising a dead plate disposed across the width of the conveyor at the entrance or the exit or both, wherein the dead plate has a top surface and air outlets opening onto the top surface and in fluid communication with the intermediate air bearings.

14. A conveyor as in claim 12 wherein the set of intermediate air bearings includes a support having a top side with one or more open-top troughs receiving the rollers and an air channel having an air inlet and one or more air outlets in fluid communication with the air inlet and opening into the troughs at the top side to form one or more air cushions supporting the rollers received in the troughs.

15. A conveyor as in claim 11 wherein the sets of first and second air bearing assemblies each include a bearing housing in which the bearing cavities are formed with an open end for receiving the first or second end of one of the rollers and with an opposite blind end.

16. A conveyor as in claim 15 wherein the air outlet injects air into the bearing cavity from the blind end and directed toward the open end.

17. A conveyor as in claim 11 wherein the bearing cavities are coated with a low-friction material.

18. A conveyor as in claim 11 wherein the first and second ends of the rollers are coated with a low-friction material.

19. A conveyor as in claim 11 wherein the first and second ends of the rollers are domed.

20. A conveyor as in claim 11 wherein the rollers are frustoconical having a large diameter at the first end and a small diameter at the second end to form a turn in the conveying direction with the second ends of the rollers at the inside of the turn.

* * * * *